(12) United States Patent
Heng et al.

(10) Patent No.: US 12,446,125 B2
(45) Date of Patent: Oct. 14, 2025

(54) LIGHTING SYSTEM CONTROL USING INTEGRATED CONTROL DEVICE ESPECIALLY USEFUL FOR LIGHTS OF SWIMMING POOLS AND SPAS

(71) Applicant: ZODIAC POOL SYSTEMS LLC, Carlsbad, CA (US)

(72) Inventors: Hwa Heng, Carlsbad, CA (US); Barton Lu, Shanghai (CN); Ricky Lo, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 690 days.

(21) Appl. No.: 17/490,458

(22) Filed: Sep. 30, 2021

(65) Prior Publication Data

US 2022/0110196 A1    Apr. 7, 2022

Related U.S. Application Data

(60) Provisional application No. 63/086,289, filed on Oct. 1, 2020.

(51) Int. Cl.
| | | |
|---|---|---|
| H05B 45/10 | (2020.01) | |
| E04H 4/14 | (2006.01) | |
| G06F 3/0482 | (2013.01) | |
| G06F 3/0484 | (2022.01) | |
| H05B 45/20 | (2020.01) | |
| H05B 47/175 | (2020.01) | |
| H05B 47/18 | (2020.01) | |
| H05B 47/185 | (2020.01) | |

(52) U.S. Cl.
CPC ............. *H05B 45/20* (2020.01); *E04H 4/148* (2013.01); *G06F 3/0482* (2013.01); *G06F 3/0484* (2013.01); *H05B 47/18* (2020.01)

(58) Field of Classification Search
None
See application file for complete search history.

(56) References Cited

U.S. PATENT DOCUMENTS

| | | | |
|---|---|---|---|
| 9,084,314 B2 | 7/2015 | Conover et al. | |
| 10,136,504 B2 | 11/2018 | Lyons et al. | |
| 10,904,986 B1 * | 1/2021 | Reddy | A61H 33/005 |
| 10,904,987 B1 * | 1/2021 | Reddy | H05B 47/185 |

(Continued)

FOREIGN PATENT DOCUMENTS

| | | | | |
|---|---|---|---|---|
| WO | 2009133489 | | 11/2009 | |
| WO | WO-2009133489 A1 * | | 11/2009 | ......... H05B 37/0263 |

OTHER PUBLICATIONS

International Application No. PCT/US2021/052834, International Search Report and Written Opinion mailed on Mar. 28, 2022, 25 pages.

(Continued)

*Primary Examiner* — Anh Q Tran
(74) *Attorney, Agent, or Firm* — Kilpatrick Townsend & Stockton LLP

(57) ABSTRACT

Methods and systems described herein provide control of a lighting system, such as a pool lighting system. The pool lighting system includes an integrated control device that includes both a transformer and a controller. Lighting devices are powered by power from the transformer using power lines and controlled using power line communication (PLC) signals sent over the same power lines.

24 Claims, 12 Drawing Sheets

(56) References Cited

U.S. PATENT DOCUMENTS

| | | | |
|---|---|---|---|
| 2008/0197788 A1* | 8/2008 | Conover | H05B 47/155 |
| | | | 315/291 |
| 2012/0267953 A1* | 10/2012 | Doyle | H02M 1/44 |
| | | | 307/31 |
| 2014/0265842 A1 | 9/2014 | Potucek et al. | |
| 2018/0035514 A1 | 2/2018 | Fournier et al. | |
| 2020/0077497 A1 | 3/2020 | Diep | |

OTHER PUBLICATIONS

International Application No. PCT/US2021/052834, International Preliminary Report on Patentability mailed on Apr. 13, 2023, 19 pages.

International Application No. PCT/US2021/052834, Invitation to Pay Additional Fees and, Where Applicable, Protest Fee mailed on Feb. 7, 2022, 8 pages.

European Application No. 21806477.2, Office Action mailed on Aug. 26, 2024, 13 pages.

\* cited by examiner

LIGHTING SYSTEM CONTROL USING INTEGRATED CONTROL DEVICE ESPECIALLY USEFUL FOR LIGHTS OF SWIMMING POOLS AND SPAS

CROSS-REFERENCE TO RELATED APPLICATION

This application claims the benefit of and priority to U.S. Provisional Application Ser. No. 63/086,289, filed Oct. 1, 2020, entitled "Lighting Control Concepts Especially Useful For Lights Of Swimming Pools And Spas," the entire contents of which are hereby incorporated by this reference.

TECHNICAL FIELD

The field of the present disclosure relates generally to lighting systems. More specifically, the present disclosure relates to an integrated control device that uses power line communications (PLC) in a pool lighting system.

BACKGROUND

Traditional color pool and spa lighting have relatively few colors/modes due to communication limitations. These types of lights typically change modes by pulsing the lights on/off in timed intervals. This approach may be limited due to bandwidth constraints and the inability to communicate to each light individually.

A known method to add communications capabilities is the use of power line communications (PLC). This method has the advantage of not requiring additional wires to carry a data signal. If used with low voltage lighting a step-down transformer (typically 120V AC to 12V AC) may be required. Passing a PLC signal over a low voltage transformer may present challenges due to signal strength reduction when the signal passes through the transformer.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

One example includes a lighting system for a swimming pool or spa. The lighting system includes an integrated control device that includes: an enclosure and a transformer within the enclosure. The transformer includes a high voltage input configurable to receive first power from an external source, and a low voltage output configurable to transport second power from the transformer. The lighting system also includes a controller within the enclosure and configured to receive the second power from the transformer. The lighting system also includes a lighting device electrically connectable to receive the second power from the transformer via an electrical connection with the low voltage output. The controller is configured to: receive control instructions from an external computing device; and send, via the electrical connection, control information based on the control instructions to the lighting device using the electrical connection when the lighting device is connected to the low voltage output via the electrical connection.

Another example includes a method. The method includes receiving, at a controller, control instructions from an external computing device. The method also includes determining, by the controller, a setting for a lighting device based on the control instructions. The method also includes generating, by the controller, control information for the lighting device to implement the setting. The method also includes sending, by the controller, the control information to the lighting device via a low voltage power line that powers the lighting device, where the low voltage power line is electrically connected to a transformer. Other embodiments of this example include corresponding computer systems, apparatus, and computer programs recorded on one or more computer storage devices, each configured to perform the actions of the method.

Another example includes a method. The method includes reading, by a controller, a plurality of addresses associated with a plurality of lighting devices electrically connected to the controller. The method also includes sending a set of addresses of the plurality of addresses to an external computing device. The method also includes responsive to receiving a first instruction from the external computing device that identifies a first address of the set of addresses, causing a first lighting device of the plurality of lighting devices to emit a first light. The method also includes responsive to receiving a second instruction from the external computing device, assigning the first lighting device to a first light group. Other embodiments of this example include corresponding computer systems, apparatus, and computer programs recorded on one or more computer storage devices, each configured to perform the actions of the method.

Another example includes a method. The method includes providing a user interface including a plurality of user interface elements that represent a plurality of lighting devices. The method also includes responsive to a first user selection of a first user interface element of the plurality of user interface elements, causing a first lighting device of the plurality of lighting devices to emit a light. The method also includes responsive to a second user selection, assigning the first lighting device to a light group. The method also includes causing a change to the light after assigning the first lighting device to the light group. Other embodiments of this example include corresponding computer systems, apparatus, and computer programs recorded on one or more computer storage devices, each configured to perform the actions of the method.

Another example includes a lighting device. The lighting device includes a set of light-emitting diodes (LEDs). The lighting device also includes a controller in electrical communication with the set of LEDs and configured to: receive, via a power line communication (PLC) scheme on a low voltage power line, light transition information; identify, from the light transition information, a set of beginning color values, a set of final color values, and a timing value defining a transition time period to transition from the set of beginning color values to the set of final color values; determine a set of intermediate color values to transition from the set of beginning color values to the set of final color values during the transition time period; and cause the set of LEDs to implement the set of intermediate color values during the transition time period.

Another example includes a method. The method includes detecting, by a pool automation system, occurrence of a predefined trigger indicative of a lighting device changing to a current color. The method also includes requesting, from a controller that controls the lighting device, a current set of light values corresponding to the current color. The method also includes storing, by the pool automation system, the current set of light values in a memory associated with the pool automation system. The method also includes providing the current set of light values to a plurality of user interfaces. Other embodiments of this example include corresponding computer systems, apparatus, and computer programs recorded on one or more computer storage devices, each configured to perform the actions of the method.

Another example includes an integrated control device for a pool lighting system. The integrated control device includes an enclosure that defines an interior volume. The integrated control device also includes a transformer housed within the interior volume, the transformer including a high voltage leg and a low voltage leg. The integrated control device also includes a set of high voltage terminals electrically coupled to the high voltage leg. The integrated control device also includes a set of low voltage terminals electrically coupled to the low voltage leg. The integrated control device also includes a controller housed within the interior volume, where: the controller is configured to output control signals via the set of low voltage terminals, and the transformer is configured to output power signals via the set of low voltage terminals.

Another example includes a lighting device. The lighting device includes a set of light emitting diodes (LEDs). The lighting device also includes a set of led drivers communicatively coupled with the set of LEDs. The lighting device also includes a microprocessor configured to: receive power line communication (PLC) signals including control instructions, and control the set of led drivers by at least powering on and powering off the led drivers. The lighting device also includes a switching circuit configured to detect power on and power off the led drivers independent of the microprocessor powering on and powering off the led drivers.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
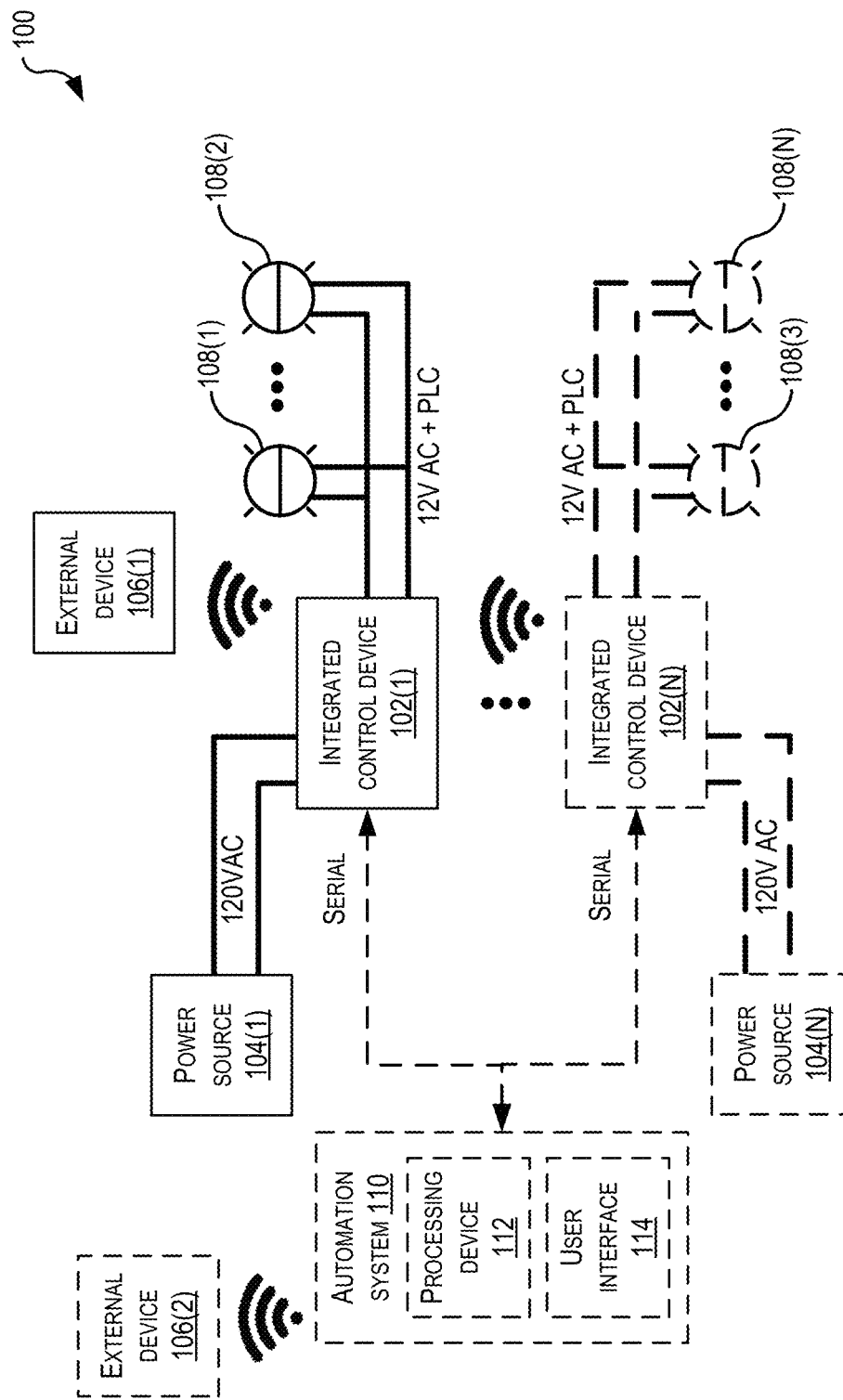
FIG. 1 illustrates a block diagram of an example lighting system, according to at least one example.

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Examples are described herein in the context of lighting systems for use in pool lighting systems. Those of ordinary skill in the art will realize that the following description is illustrative only and is not intended to be in any way limiting. For example, the techniques described herein can be used to control and/or manage other low voltage lighting systems that are not specifically pool lighting systems (e.g., landscape lighting, spa lighting, accent lighting, etc.). Reference will now be made in detail to implementations of examples as illustrated in the accompanying drawings. The same reference indicators will be used throughout the drawings and the following description to refer to the same or like items.

Described herein are systems and methods for providing enhanced control of pool lighting systems. In some examples, such systems and methods may utilize an integrated control device that includes a transformer and a controller mounted in the same housing. The systems and methods described herein may enable control of the pool lighting systems by multiple different control interfaces, which may be synced across multiple systems. The systems and methods described herein also enable easy assignment of lights to light groups, enable smooth transitions between colors of lights, provide for real-time monitoring and sharing of troubleshooting data, allow for retrofitting applications to avoid full-scale replacement of pool automation systems, do not require additional equipment to pass communications using PLC signals, provide for stand-alone configuration, and provide other improvements that will be evident throughout this specification.

Turning now to a particular example, a pool lighting system may be provided. The pool lighting system may include an integrated control device powered by a power source (e.g., 120V AC), one or more lighting devices that receive power from the integrated control device, and an external control device such as a handheld user device with a mobile application. The integrated control device includes a controller and a transformer. In some cases, the transformer and the controller are included in the same housing. The transformer transforms 120V AC to 12V AC, which is used to power the lighting devices. The controller receives control information from the external control device, generates control instructions for the lighting devices, and sends the control instructions to the lighting devices via PLC signals on the 12V AC line from the transformer. Because the control instructions do not pass through the transformer, the signals are delivered quickly and with high fidelity to the lighting devices. The lighting devices may use their own controllers (e.g., microprocessors) to take the control instructions and determine smooth transitions between colors. This approach may avoid light flicker, which is a common problem in conventional systems due to communication time and/or limitations on bandwidth. To troubleshoot the lighting devices and the system overall, the lighting devices may share operational parameters with the integrated control device, which may then share the parameters with the external computing device or other system for troubleshooting. When the lighting devices are uniquely addressed, the system described herein may provide a method of easily assigning lights to a particular light group. Depending on the configuration of the system, the light groups and/or colors of lights within groups may be updated from multiple different locations (e.g., mobile application, pool automation system, user interface connected to pool automation system, etc.), and then synced across systems.

This illustrative example is given to introduce the reader to the general subject matter discussed herein and the disclosure is not limited to this example. The following sections describe various additional non-limiting examples systems and methods for providing enhanced control of pool lighting systems.

Turning now to the figures, FIG. 1 illustrates a block diagram of an example lighting system 100, according to at least one example. The lighting system 100 includes an integrated control device 102(1) that is powered by power source 104(1). Generally, the integrated control device 102(1) receives control information from external computing device 106(1), which the integrated control device 102(1) uses to control one or more lighting devices 108(1)-(2). The components of the lighting system 100 that are illustrated in solid lines and introduced previously may implement a standalone system that is operable with or without a pool automation system.

The power source 104(1) may be configured to provide power of a first type (e.g., 120V AC). The integrated control device 102(1), as described in more detail in FIGS. 2 and 3, may include a transformer to transform the power to a second type (e.g., 12V AC) to power the lighting devices 108. The power source 104(1) may include line voltage from the power grid, output from a generator, or any other suitable power source (e.g., output from batteries, solar panels, etc.).

Figure 2:
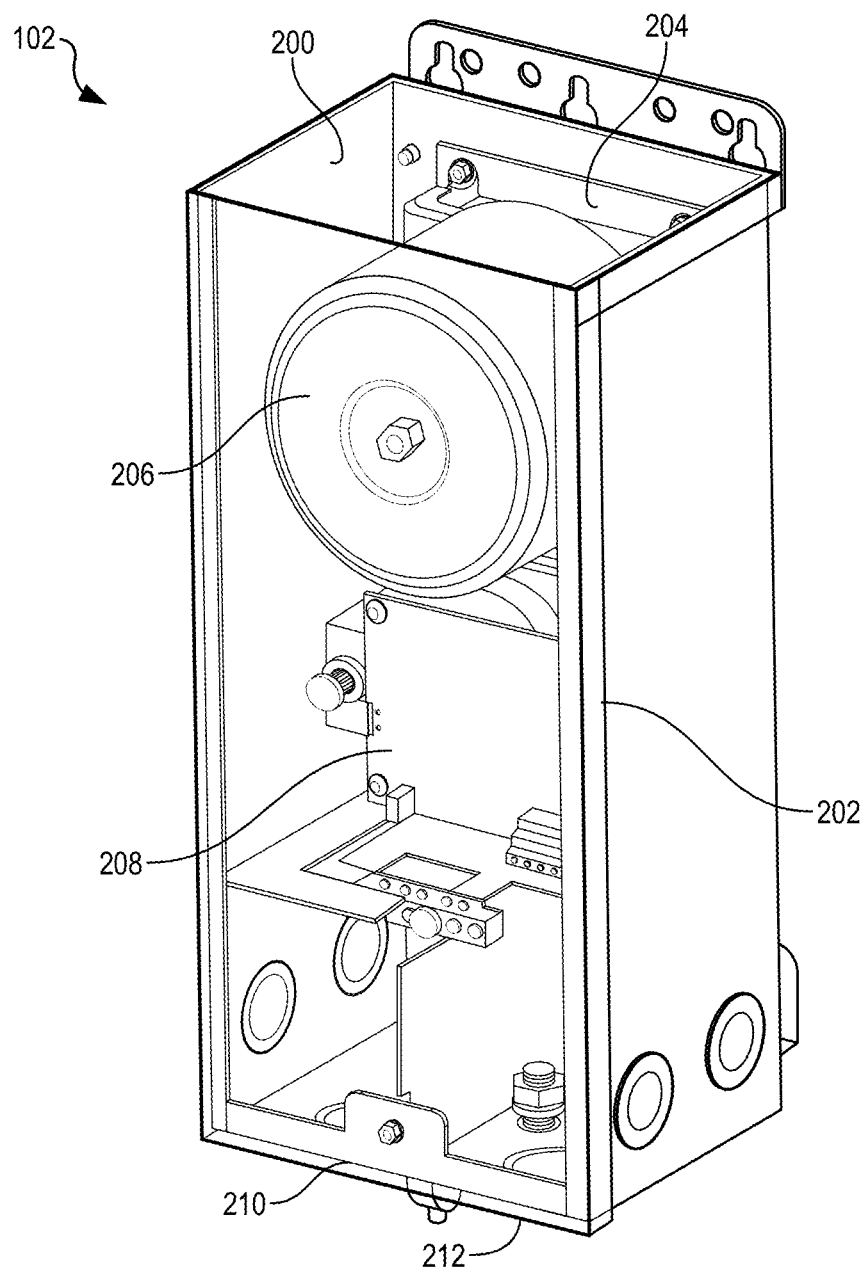
FIG. 2 illustrates an example integrated control device, according to at least one example.
Figure 3:
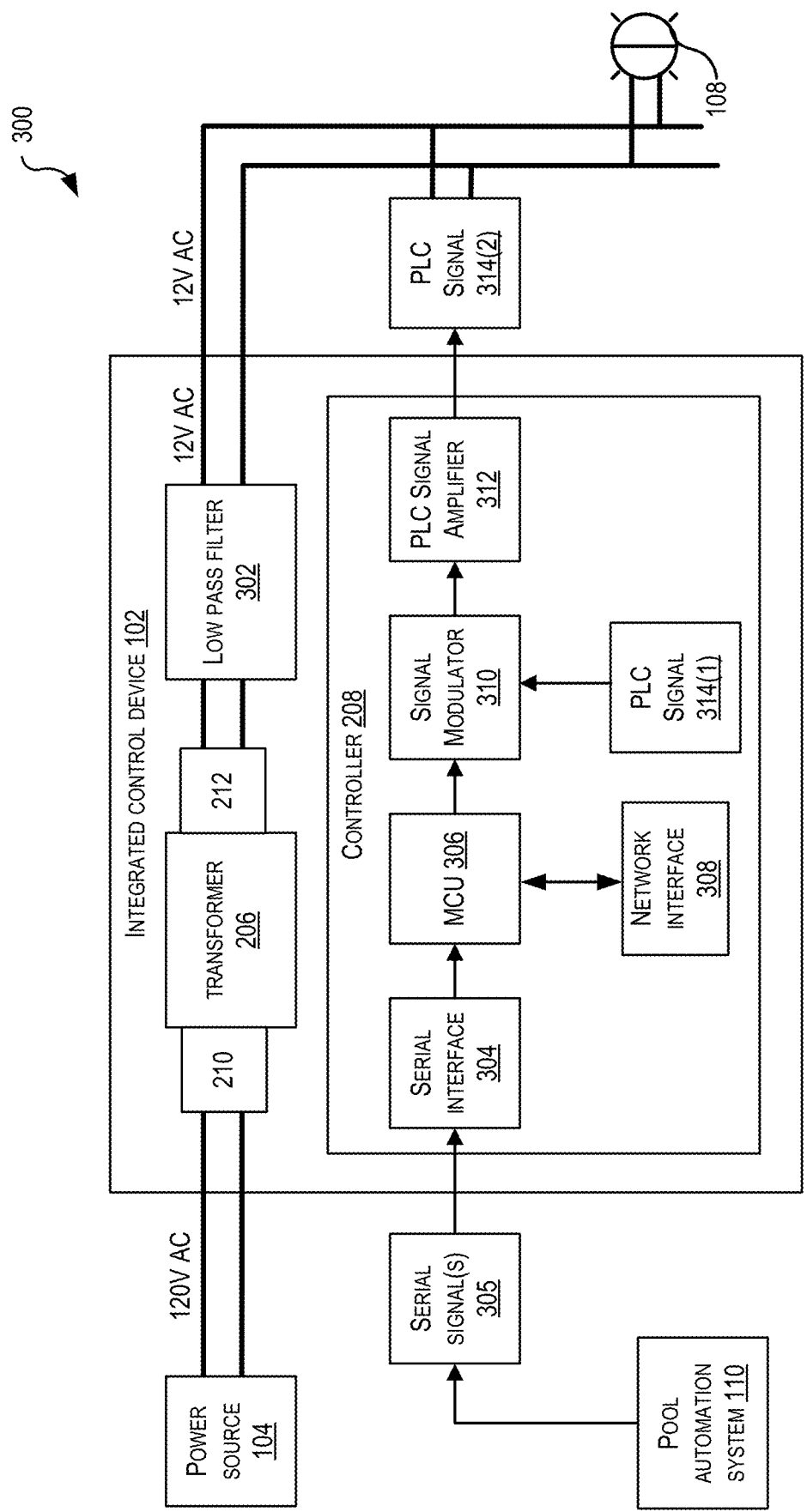
FIG. 3 illustrates a block diagram of an example lighting system illustrating aspects of the integrated control device of FIG. 2, according to at least one example.

The integrated control device 102(1), as described in more detail in FIGS. 2 and 3, includes a controller that is configured to communicate with the external computing device 106(1), which may be a web application, electronic handheld user device application, or the like, using a protocol appropriate to enable such communications. For example, these devices 102(1) and 106(1) may communicate over WiFi, Ethernet, Bluetooth, or other suitable data transfer schema. For example, when the external computing device 106(1) includes a mobile application, the external computing device 106(1) may send instructions to the integrated control device 102(1) via a WiFi connection, via Bluetooth, via the Internet, or via any suitable combination of the foregoing and/or other suitable schema. The controller of the integrated control device 102(1) may be configured to user PLC signals to control the operations of the lighting devices 108. This may include sending transition information that the lighting devices 108 can use to control the transition of the lighting devices 108 between colors.

Figure 4:
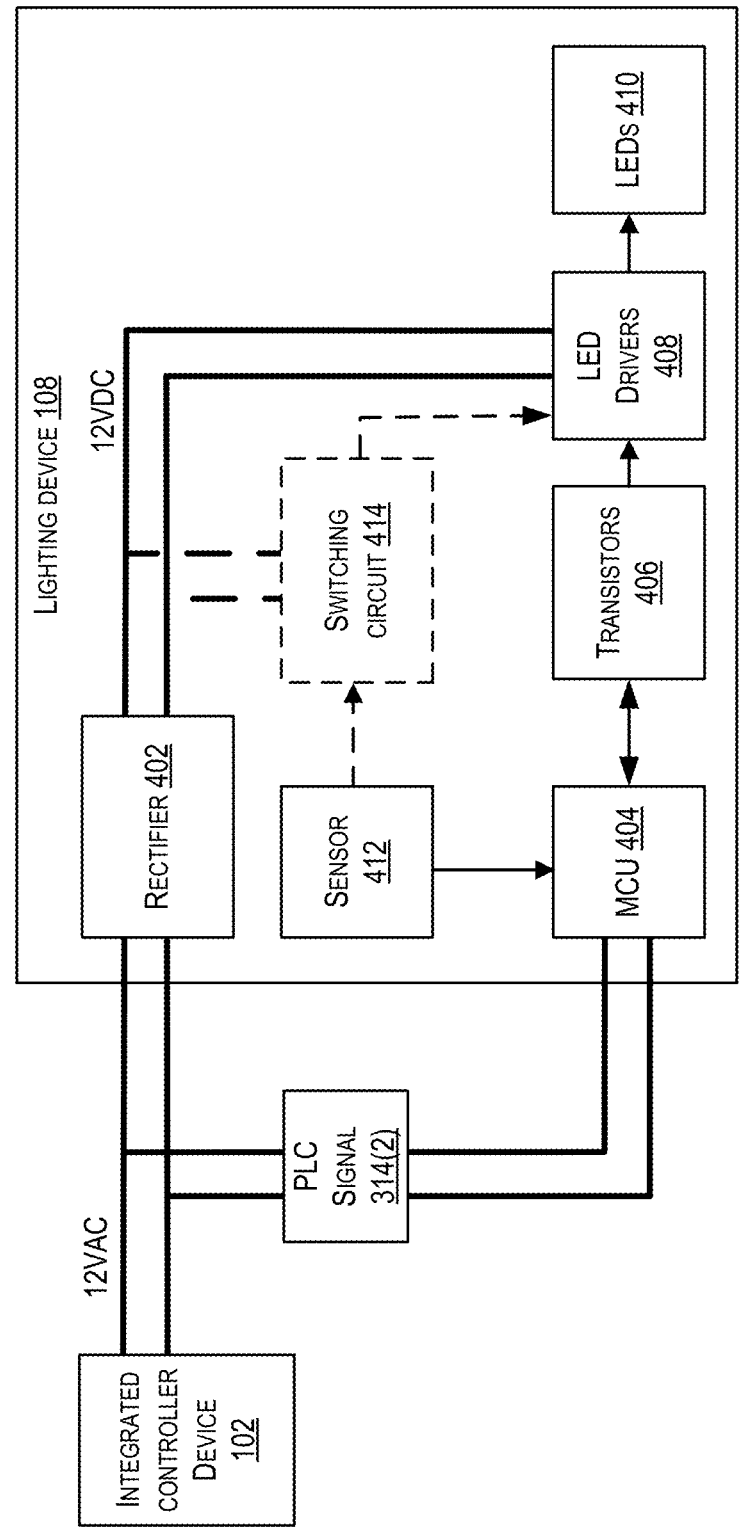
FIG. 4 illustrates a block diagram of an example lighting system illustrating aspects of a lighting device, according to at least one example.

The lighting devices 108(1)-108(2), as described in more detail in FIG. 4, may include light-emitting diodes (LEDs) and componentry suitable for processing signals from the integrated control device 102(1) and, in some examples, sending information to the integrated control device 102(1). For example, such processing may include calculating transition graphs to guide transitioning of lights of the lighting devices 108(1)-108(2) between different colors based on transition information received from the integrated control device 102(1). Information that may be shared includes operational parameters (e.g., temperature, time on, time between transitions, colors in-use, historical colors used, and the like). These may be used by the integrated control device 102(1) and/or other computing device for improving, optimizing, or otherwise adjusting the operation of the lighting devices 108. In some aspects, the lighting devices 108 may be positioned in an environment having water. For example, the lighting device 108 may represent a light in a swimming pool or spa. In some aspects, the integrated control device 102 and/or the pool automation system 110 may include a processing device capable of controlling the lighting devices 108 to emit light signals in multiple different colors.

The other components of FIG. 1 illustrated in dashed lines may also be included in the lighting system 100, according to some examples. For example, with the addition of the pool automation system 110 and the external computing device 106(2), the lighting system 100 may be referred to as a system made up of a single controller with pool automation. Turning now to the pool automation system 110, the pool automation system 110 may include a processing device 112 and a user interface 114. The processing device 112 may be any suitable microprocessor, processor, or the like capable of accessing memory and executing computer-executable instructions. The user interface 114 may enable a user to control aspects of the pool automation system 110, the integrated control device 102, and/or the lighting devices 108. For example, the user interface 114 may include a display that allows a user to turn on/turn off, control brightness, change color, etc. of the lighting devices 108. The user interface may also include a hardware device for inputting instructions into the pool automation system 110. Instructions from the pool automation system 110 may be passed to the integrated control device 102(1) via any suitable interface such as a serial interface (e.g., RS-485).

The pool automation system 110 may also include suitable componentry to enable communication with external computing device 106(2), which may be configured similar to (or be the same as) external computing device 106(1). This may enable a user of the external computing device 106(2) to control aspects of the pool automation system 110, such as those described above with respect to the user interface 114.

As an additional example configuration of the lighting system 100, the lighting system 100 may also include a second integrated control device 102(N), a second power source 104(N), and any suitable number of lighting devices 108(3)-108(N). The integrated control device 102(N), the lighting devices 108(3)-108(N), and the power source 104 (N) may be configured similarly as described previously with respect to the integrated control device 102(1) and the pool automation system 110. For example, the pool automation system 110 may be used to control any suitable number of integrated control devices 102 (e.g., even more than two), which essentially creates different lighting subsystems that are individually controllable themselves and include individually controllable lighting devices.

FIG. 2 illustrates an example integrated control device 102, according to at least one example. Generally, the integrated control device 102 may be used to transform power from one type to another, receive control instructions from multiple different interfaces using different protocols, generate control information for lighting devices based on the control instructions, and send the control information to the lighting devices using PLC signals.

The integrated control device 102 includes a housing 200 to house components of the integrated control device 102. The housing 200 may take any suitable form or shape. As illustrated, the housing 200 may take the form of a multi-sided rectangle that defines an interior volume (e.g., volume within the inside of the rectangle). The interior volume may be enclosed by a lid 202, which may be removable from the housing 200 to enable access to the components housed therein. The housing 200 may also include a mounting bracket 204 for mounting the components of the integrated control device 102 within the housing 200. For example, the bracket 204 may be coupled with an interior wall of the housing 200 and the components may be coupled to the bracket 204.

The integrated control device 102 may be integrated in the sense that it includes both a transformer 206 and a controller 208, among other components. The integrated control device 102 may be used to control lighting devices without the use of a pool automation system. Additionally, the integrated control device 102 may be easily installed by installation professionals because the transformer 206 and the controller 208 are included in the same housing 200, thereby eliminating the need to mount multiple housings and/or run additional power and/or signaling lines.

Generally, the transformer 206 may operate to transform high-voltage power received by the integrated control device 102 via a set of high voltage terminals 210 in electrical communication with a high voltage side of the transformer 206 into low-voltage power. The low-voltage power may then be delivered to accessory devices such as lighting devices via a set of low-voltage terminals 212 in electrical communication with a low voltage side of the transformer 206. The low-voltage power may also be used to power the controller 208 and/or any other suitable component within the integrated control device 102 (e.g., interfaces, radios, speakers, microphones, other I/O devices, and the like).

Generally, the controller 208 may be configured to receive control information as input, generate control instructions, and share those control instructions with accessory devices such as lighting devices via PLC signals that are sent to the accessory devices via the set of low voltage terminals 212. In this manner, the generated PLC signals may be sent on electrical connections that are transferring power at a low voltage (e.g., 12V AC). In some examples, this approach for sending control signals may result in more uniform light at the lighting device 108 and avoid the costs of using other systems that might include additional components.

FIG. 3 illustrates a block diagram of an example lighting system 300 illustrating aspects of the integrated control device 102, according to at least one example. The lighting system 300 includes components introduced and described with respect to FIGS. 1 and 2. For example, the lighting system 300 includes the power source 104, the pool automation system 110, one or more lighting devices 108, and the integrated control device 102.

The power source 104 may provide power to the transformer 206 via the set of high voltage terminals 210. The transformer 206 may be a standard 120V AC-to-12V AC transformer. That is, the transformer 206 transforms a 120V AC power supply to a 12V AC power output. As used in FIG. 3, the lighting device 108 is powered by a 12V AC voltage that flows out of the transformer 206 via the set of low voltage terminals 212. The 12V AC voltage provided to the lighting device 108 may be transformed from a 120V AC grid electric power supply. The integrated control device 102 also includes a low pass filter 302, which may be configured to remove certain high frequencies in the power output and allow lower ones to pass through to the lighting device 108.

The pool automation system 110 may include a serial interface to communicate with a corresponding serial interface 304 in the controller 208. In this manner, the pool automation system 110 may provide information/instructions to the controller 208 as serial signals 305. For example, the serial signal 305 may be a RS-485 signal, or other comparable serial signal. In some examples, use of the serial connection between the pool automation system 110 and the integrated control device 102 may enable retrofit installations of the integrated control device 102 without needing to replace the pool automation system 110. In addition, the single serial connection between the pool automation system 110 and the integrated control device 102 may be easily installed by installation professionals with little training. In some examples, more than one serial connection is made (e.g., when more than one integrated control device 102 is provided in the lighting system 300).

In this non-limiting example, the controller 208 of the integrated control device 102 includes the serial interface 304 for receiving serial signals 305, a microprocessor unit (MCU) 306, a network interface 308, a signal modulator 310, and a PLC signal amplifier 312. In operation, the network interface 308 may enable network communications with one or more external computing devices via any suitable network connection (e.g., Internet, Bluetooth, WiFi, etc.). In some examples, the controller 208 may also include a network radio and/or telemetry to enable the controller 208 to connect to a cellular or other suitable network. Via the network interface 308, control information and/or control instructions may be received by the MCU 306.

The MCU 306 (and any other MCU described herein) may be any suitable processing device capable of executing a set of instructions. The instructions may be hardware, firmware, and/or software based. In some examples, the MCU 306 includes a memory for storing non-transitory computer-executable instructions and a processor for accessing the memory and executing the computer-executable instructions. The MCU 306 may also include any suitable onboard sensors and the like for operating the MCU 306 and/or for diagnosing the MCU 306.

The MCU 306 may provide instructions to the signal modulator 310 (e.g., a set of operational parameters for the lighting device 108). The signal modulator 310 may take a PLC signal 314(1) and modulate the signal according to any suitable PLC schema. The PLC signal amplifier 312 may amplify the modulated PLC signal 314(1) in order to deliver the PLC signal 314(2) to the lighting device 108 via the low voltage power lines, e.g., the same power lines that provide power to the lighting device 108.

FIG. 4 illustrates a block diagram of an example lighting system 400 illustrating aspects of the lighting device 108, according to at least one example. The lighting system 400 includes components introduced and described with respect to FIGS. 1, 2, and 3. For example, the lighting system 300 includes integrated control device 102 and the lighting device 108, with the lighting device 108 being shown in additional detail.

As described herein, the integrated control device 102 may be configured to provide power to the lighting device 108 and the PLC signal 314(2) to the lighting device 108. In particular, the power is provided to a rectifier 402. The rectifier 402 may be any suitable rectifier device for converting the 12V AC from the integrated control device 102 to 12V DC. This may be because LED drivers 408 require direct current. In some examples, the rectifier 402 may be omitted.

The PLC signal 314(2) is received at an MCU 404 of the lighting device 108. In some examples, the MCU 404 may be any suitable controller or other device capable of performing the techniques described herein. For example, the MCU 404 may be configured similar to the MCU 306 of the controller 208, as described herein. The MCU 404 in particular may be configured to perform various functions such as determining, from the PLC signal 314(2), control information/control instructions for controlling the LEDs 410. For example, this may include information that the MCU 404 can use to generate light transition information such as a set of beginning values for the LEDs 410, a set of final color values for the LEDs 410, and a timing value for transition between the beginning values and the final values. In some examples, the MCU 404 may compute this information to define a linear transition between the two set of values (e.g., red to green) during a certain time period (e.g., 2 seconds). The MCU 404 may also store operational parameters of the lighting device 108 such as information from one or more sensors 412 (e.g., temperature sensor, humidity sensor, water sensor, and/or other sensors useable to monitor conditions of the lighting device 108) and information that has been generated by the MCU 404 (e.g., color values for the LEDs 410).

The lighting device 108 may also include one or more transistors 406 configured to providing switching and/or amplification of signals from the MCU 404. The LED drivers 408 may be configured to receive control instructions from the MCU 404 and power from the rectifier 402. The LED drivers 408 may be any suitable circuitry configured to power the LEDs 410. The LEDs 410 may be any suitable set(s) of LEDs such as, for example, red, green, blue, and white. In some examples, the combination of LEDs 410 may enable almost any color on the visible spectrum. In some examples, the colors may be predefined by the systems described herein (e.g., predefined red, blue, and green values) and/or may be user defined. Similar transition between colors may be predefined and/or user defined.

The lighting device 108 may also include a switching circuit 414. The switching circuit 414 may be configured to detect on/off switching (e.g., instructions to power on and power off the LED drivers 408). In some examples, the switching circuit 414 can retain power long enough (e.g., generally 1-20 seconds) so that the off time can be measured by the switching circuit 414 and/or a different component of the lighting device 108. This may enable the lighting device 108 to store information about state of the lighting device 108 for use when turning the lighting device 108 back on. Otherwise, the color of the lighting device 108 may change each time the light is turned on. This may also be helpful to store the state information to avoid having to index through a series of lights when lights have been placed into light groups, etc.

FIGS. 5-10 illustrate example flow diagrams showing processes 500, 600, 700, 800, 900, and 1000 according to at least a few examples. These processes, and any other processes described herein, are illustrated as logical flow diagrams, which may be implemented by a human user and/or one or more computer systems. For example, at least some operations may represent a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

Figure 5:
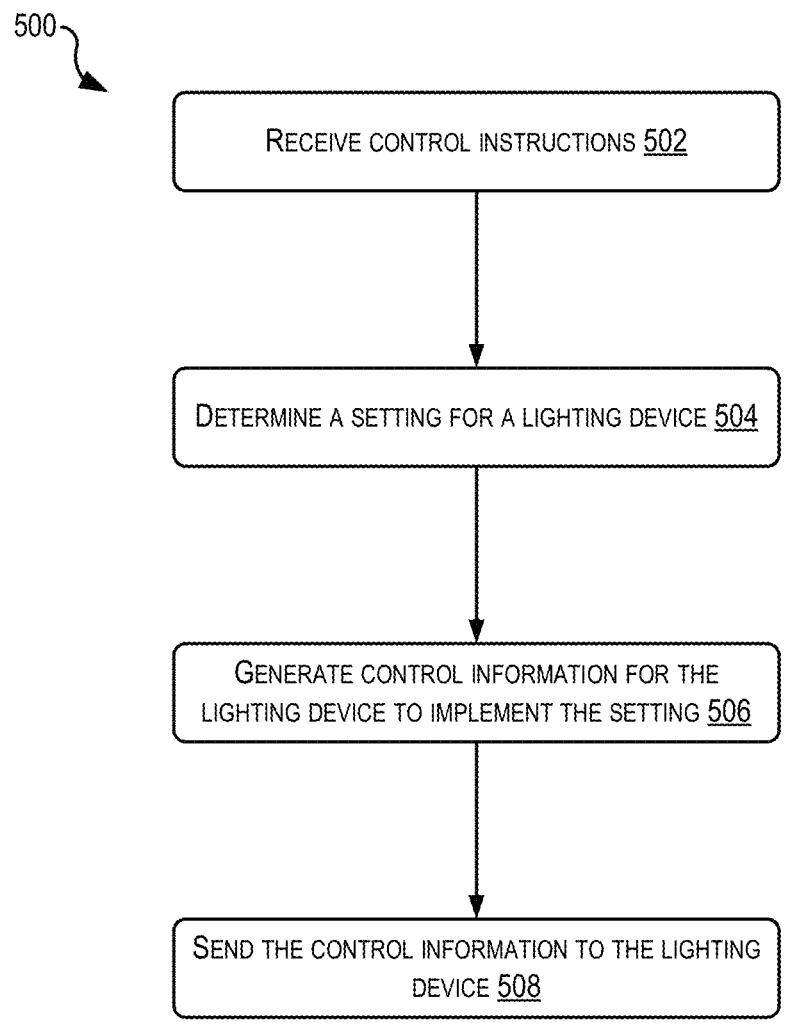
FIG. 5 illustrates a flow chart depicting an example process for controlling a lighting device, according to at least one example.

FIG. 5 illustrates a flow chart depicting an example process 500 for controlling a lighting device, according to at least one example. The process 500 is performed by the integrated control device 102 (FIG. 1), including the controller 208 (FIG. 2) and the MCU 306 (FIG. 3). The process 500 in particular corresponds to using power lines that power a lighting device to send control information to the lighting device.

The process 500 begins at block 502 by the controller 208 receiving control instructions. The control instructions may be received from an external computing device. For example, the external computing device may be a mobile device executing a mobile application and/or a web application. The web application may include functionality to enable a user to adjust settings for a lighting device.

At block 504, the process 500 includes the controller 208 determining a setting for a lighting device. This may be based on the control instructions received at block 502. The settings may include color settings, transition settings for when transitioning between two colors, strobe settings, flash settings, timer settings, and the like.

At block 506, the process 500 includes the controller 208 generating control information for the lighting device to implement the setting. This may include the controller generating a PLC signal that includes the control information.

At block 508, the process 500 includes the controller 208 sending the control information to the lighting device. This may include the controller 208 addressing the control information to the lighting device. This may be performed using the control instructions and setting information and/or by accessing a local table or the like that stores the address information for each lighting device. The address information may define, for each lighting device, a unique identifier, a location (e.g., spa, pool, water fountain, etc.), group (e.g., shallow pool group, deep pool group, etc.), and the like. As described herein, the control information may be sent via a low voltage power line that powers the lighting device. The low voltage power line may be electrically connected to a transformer. The transformer may be included in an integrated control device that includes the controller 208. This may include the controller 208 and the transformer being mounted within the same enclosure.

In some examples, the control information may include light transition information useable by the lighting device to transition between at least two colors. The light transition information may include a set of beginning color values (e.g., for the LEDs of the lighting device), and a set of final color values (e.g., for the LEDs of the lighting device), and a timing value defining a time to transition from the set of beginning color values to the set of final color values.

In some examples, sending the control information to the lighting device via the low voltage power line may include sending the control information without a bridge. In conventional approaches, the control information (e.g., PLC signal) may originate at a high voltage location and, in order to be delivered to the lighting device, must be bridged across parts of the controller and/or the transformer. The techniques described herein avoid this limitation.

Figure 6:
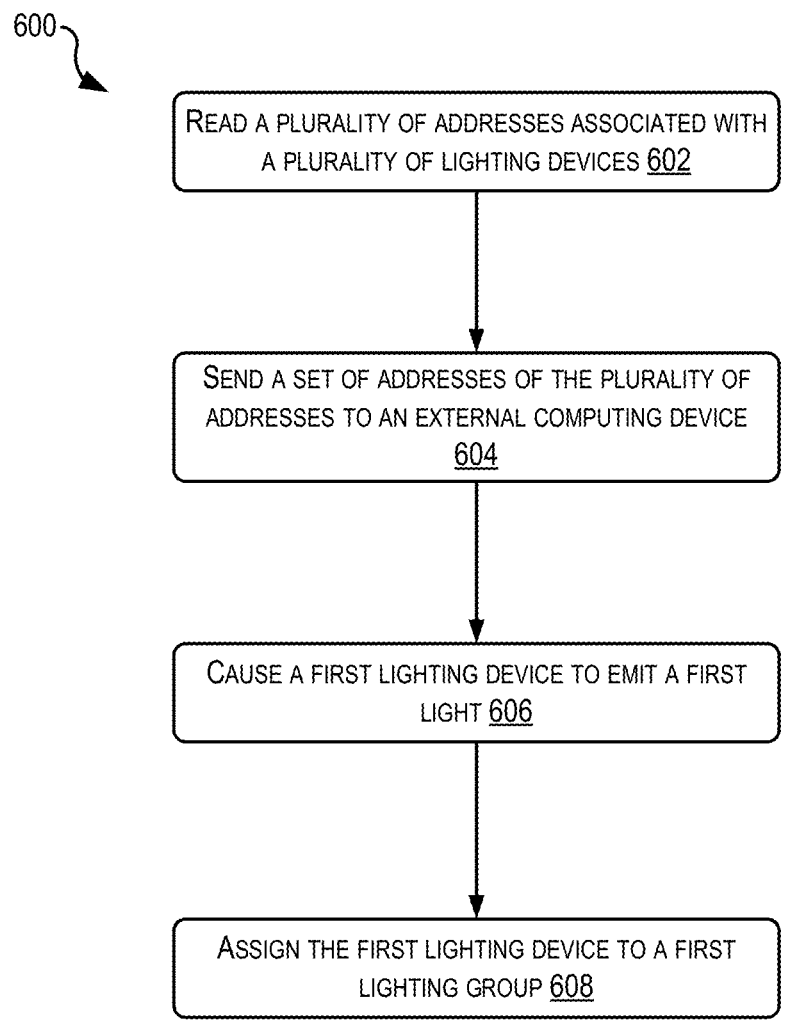
FIG. 6 illustrates a flow chart depicting an example process for controlling a lighting device, according to at least one example.

FIG. 6 illustrates a flow chart depicting an example process 600 for controlling a lighting device, according to at least one example. The process 600 is performed by the integrated control device 102 (FIG. 1), including the controller 208 (FIG. 2) and the MCU 306 (FIG. 3). The process 600 in particular corresponds to assigning uniquely-addressed lighting devices to light groups from the perspective of the controller 208.

The process 600 begins at block 602 by the controller 208 reading a plurality of addresses associated with a plurality of lighting devices. The plurality of lighting devices may be electrically connected to the controller. For example, the lighting devices may be electrically connected to receive PLC signals from the controller 208.

At block 604, the process 600 includes the controller 208 sending a set of addresses of the plurality of addresses to an external computing device. This may include the controller 208 sending the plurality of addresses to the external computing device via a network interface. The addresses may be unique with respect to each other. In some examples, the set of addresses may be accessed from a memory local to the controller 208 and/or by polling the individual lighting devices.

At block 606, the process 600 includes the controller 208 causing a first lighting device of the plurality of lighting devices to emit a first light. This may be performed responsive to receiving a first instruction from the external computing device that identifies a first address of the set of addresses. For example, a user may use the external computing device (e.g., a user interface within a light management application) to select the first lighting device (e.g., a UI element that identifies the first lighting device). In some examples, the user may input the address.

At block 608, the process 600 includes the controller 208 assigning the first lighting device to a first light group. This may be performed responsive to receiving a second instruction from the external computing device. For example, using the user interface described herein the user may assign the first lighting device to the first light group. This action, when received by the controller 208, may cause the controller 208 to make the assignment. The assignment information may be stored by the controller 208, shared with and stored by the external computing device, stored by an automation system, and/or stored by a cloud-based server system.

Figure 7:
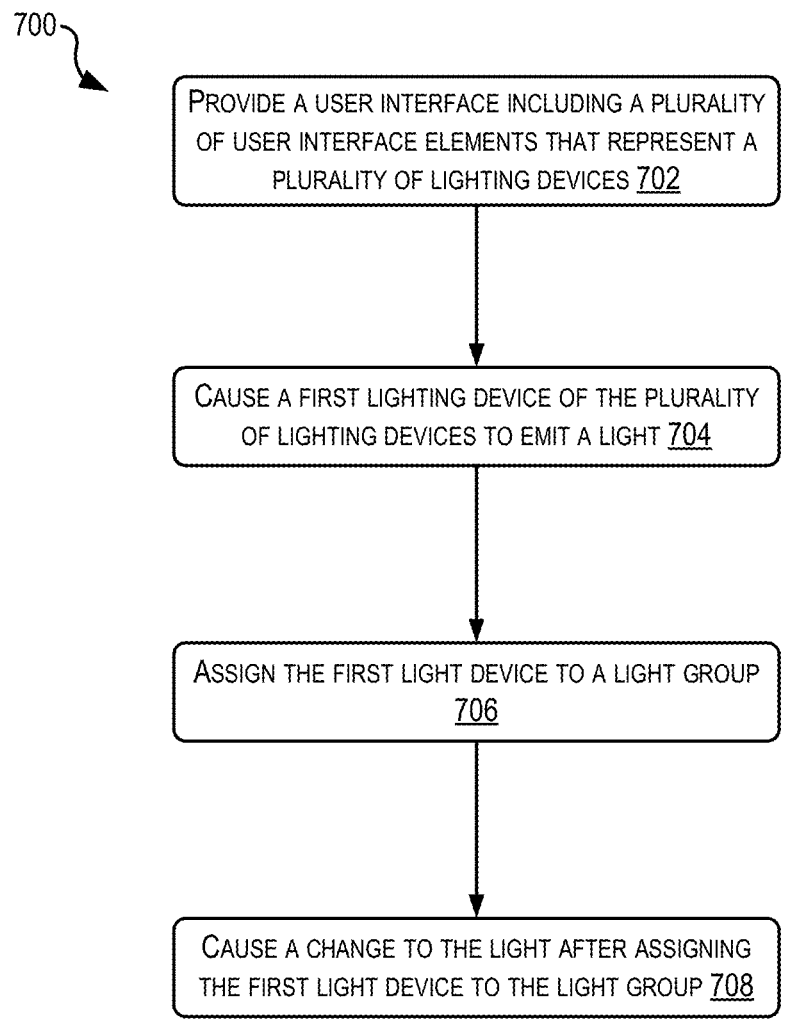
FIG. 7 illustrates a flow chart depicting an example process for controlling a lighting device, according to at least one example.

FIG. 7 illustrates a flow chart depicting an example process 700 for controlling a lighting device, according to at least one example. The process 700 is performed by the external computing device 106 (FIG. 1). The process 700 in particular corresponds to assigning uniquely-addressed lighting devices to light groups from the perspective of the external computing device 106.

The process 700 begins at block 702 by the external computing device 106 providing a user interface including a plurality of user interface elements that represent a plurality of lighting devices. The user interface may be, for example, the user interface 1100.

At block 704, the process 700 includes the external computing device 106 causing a first lighting device of the plurality of lighting devices to emit a light. This may be performed responsive to a first user selection of a first user interface element of the plurality of user interface elements, as presented on the user interface. The first lighting device may emit the light in real-life. For example, the process 700 may be performed while the user is viewing the physical space in which the plurality of lighting devices (e.g., the lighting system) is implemented. In some examples, causing the first lighting device to emit the light may include causing the first lighting device to emit a flashing light.

At block 706, the process 700 includes assigning the first lighting device to a light group. This may be performed responsive to a second user selection. For example, the second user selection may include a user selection of user interface that transfers the instruction to the controller.

At block 708, the process 700 includes causing a change to the light after assigning the first lighting device to the light group. For example, the light may change to a different color, flicker, or perform any other action that may alert the user to the fact that the light has been assigned to the zone. In some examples, the change to the light may include causing the first lighting device to emit a colored light that is associated with the light group.

Figure 8:
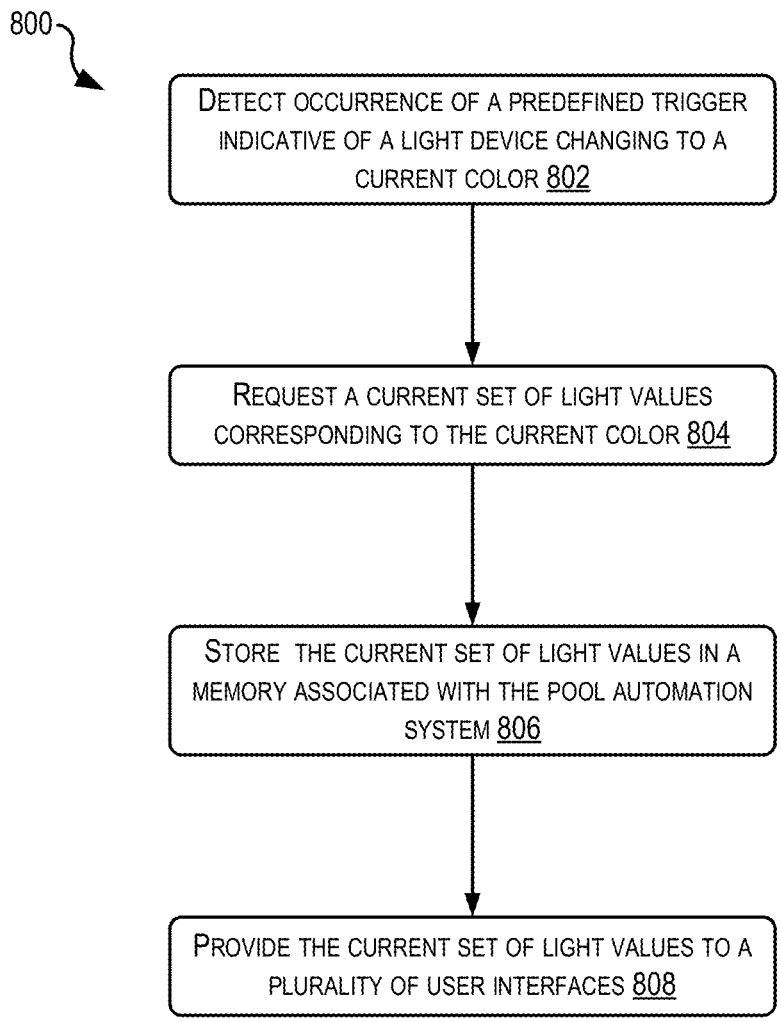
FIG. 8 illustrates a flow chart depicting an example process for controlling a lighting device, according to at least one example.

FIG. 8 illustrates a flow chart depicting an example process 800 for controlling a lighting device, according to at least one example. The process 800 is performed by the pool automation system 110 (FIG. 1). The process 800 in particular corresponds to sharing values of lighting devices responsive to triggers.

The process 800 begins at block 802 by the pool automation system 110 detecting occurrence of a predefined trigger indicative of a lighting device changing to a current color. In some examples, detecting occurrence of the predefined trigger may include monitoring communications between the pool automation system and a light controller for the predefined trigger. For example, the light controller may periodically report information about its lighting device to the pool automation system. The signal itself may indicate that the information has changed (e.g., values for the lighting device have been updated) and/or the signal may be processed by the pool automation system to detect the change. The change may have occurred as a result of a user using an external computing device and/or a different interface (other than the pool automation system) to change the values of the lighting device. The process 800 may function to ensure that all interfaces have up-to-date information.

At block 804, the process 800 includes the pool automation system 110 requesting a current set of light values corresponding to the current color. The requesting may be from a lighting controller that controls the lighting device.

At block 806, the process 800 includes the pool automation system 110 storing the current set of light values in a memory associated with the pool automation system.

At block 808, the process 800 includes the pool automation system 110 providing the current set of light values to a plurality of user interfaces. In some examples, the plurality of user interfaces may include two or more of a first user interface of an application on a mobile device connected to the pool automation system, a second user interface of the application on the mobile device connected to the controller, or a third user interface connected to the pool automation system.

Figure 9:
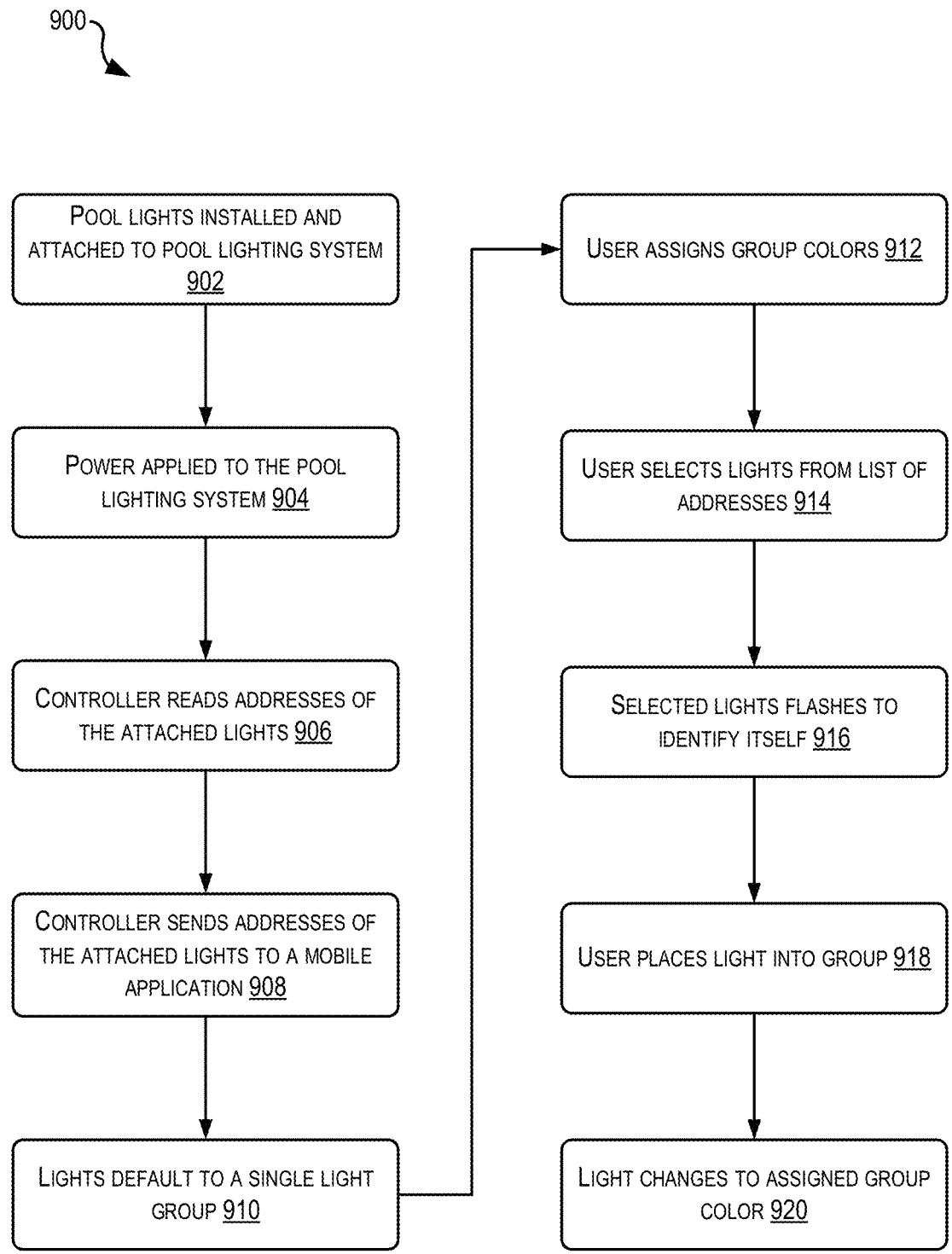
FIG. 9 illustrates a flow chart depicting an example process for assigning lights to a light group, according to at least one example.

FIG. 9 illustrates a flow chart depicting an example process 900 for assigning lights to a light group, according to at least one example. The process 900 may be performed by the various elements of the lighting system 100 (FIG. 1), the user interface 1100 (FIG. 11), and different users. The process 900 in particular corresponds to a series of blocks for assigning lights to light groups.

The process 900 begins at block 902 by pool lights being installed and attached to a pool lighting system. For example, this may include an installer installing the pool lights (e.g., lighting devices) and wiring the lights into the pool lighting system so they can receive power and PLC signals.

At block 904, the process 900 includes applying power to the pool lighting system.

At block 906, the process 900 includes a controller reading addresses of the attached lights. The controller may read the addresses from memory of the controller, by polling the lighting devices, and/or in any other suitable manner.

At block 908, the process 900 includes the controller sending addresses of the attached lights to a mobile application. For example, the addresses may be sent to the mobile application executing on a mobile device and/or to a web application executing on any suitable electronic device. The addresses may be processed by the application and presented within a user interface on the application, e.g., like the user interface 1100.

At block 910, the process 900 includes the lights defaulting to a single light group. For example, as part of the process of assigning the lights, the lights may first be assigned to a default group.

At block 912, the process 900 includes the user assigning group colors. This may include the user using the user interface 1100 to pick colors for one or more light groups.

At block 914, the process 900 includes the user selecting lights from a list of addresses. The list of addresses may be presented together with user interface elements that represent the lights, as presented in the user interface 1100.

At block 916, the process 900 includes the selected light flashing to identify itself. For example, the light may flash in the pool or other physical location.

At block 918, the process 900 includes the user placing the light into a group. This may include using the user interface 1100.

At block 920, the process 900 includes the light changing colors to the assigned group color.

Figure 10:
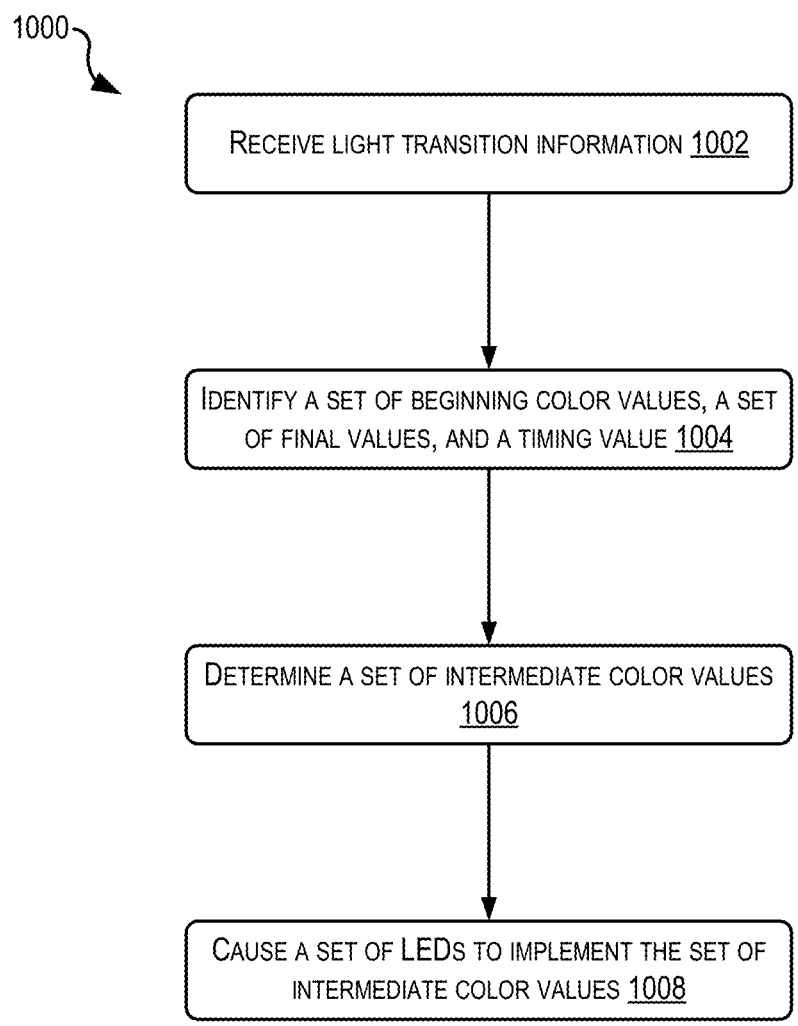
FIG. 10 illustrates a flow chart depicting an example process for controlling a lighting device, according to at least one example.

FIG. 10 illustrates a flow chart depicting an example process 1000 for controlling a lighting device, according to at least one example. The process 1000 is performed by the lighting device 108 (FIGS. 1 and 4), including the MCU 404 (FIG. 4). The process 1000 in particular corresponds to the lighting device 108 computing light values for transitioning one or more LEDs from first colors to second colors.

The process 1000 begins at block 1002 by the MCU 404 (e.g., a controller) receiving light transition information. This information may be received via a power line communication (PLC) scheme on a low voltage power line. The low voltage power line may be connected to an integrated control device. The light transition information include a set of beginning color values (e.g., a first set of red, green, and blue values for a lighting device), a set of final color values (e.g., a second set of red, green, and blue values for a lighting device), and a timing value defining a transition time period to transition from the set of beginning color values to the set of final color values. The controller 208 of the integrated control device 102 may generate the light transition information based at least in part on instructions received via a user interface. For example, a user using a mobile application or pool automation system may request that a lighting device or a set of lighting devices be changed from a first color to a second color. In some examples, the user may also define the time for transitioning between the first color and the second. In some examples, the controller 208 may determine the transition time and include it in the light transition information.

In some examples, the light transition information may be included in a single message received from the integrated control device. For example, rather than streaming the values to the lighting device, a single message including the beginning values, the ending values, and the timing value may be sent to the lighting device. With this information, the lighting device may compute an appropriate transition plan (e.g., block 1006) for transitioning the lighting device to the ending values. This may result in bandwidth savings because a single message is sent and the lighting device does some of the computations, rather than a remote controller determining the values and streaming them (or providing them in a larger data package) to the lighting device.

At block 1004, the process 1000 includes the MCU 404 identifying a set of beginning color values, a set of final color values, and a timing value defining a transition time period to transition from the set of beginning color values to the set of final color values. This may be based on the light transition information. In some examples, the set of beginning color values, the set of final color values, and the timing value are predefined values. For example, the user may select the color values from a set of predefined colors (e.g., red, green, blue, purple, orange, etc.). In some examples, at least on one of the set of beginning color values, the set of final color values, or the timing value is user-selected. For example, the user may create unique colors (e.g., by selecting different red, green, and blue values) using any suitable technique (e.g., selecting from a color wheel, inputting values in a user interface, etc.).

At block 1006, the process 1000 includes the MCU 404 determining a set of intermediate color values. The set of intermediate color values may be suitable for transitioning the lighting device from the set of beginning color values to the set of final color values during the transition time period. The set of intermediate color values may represent a linear transition between the first color and the second color during the defined transition time period.

At block 1008, the process 1000 includes the MCU 404 causing the set of LEDs to implement the set of intermediate color values during the transition time period. In some examples, causing the set of LEDs to implement the set of intermediate color values during the transition time period includes using the address information to uniquely instruct individual LEDs of the set of LEDs to implement the set of intermediate color values during the transition time period.

Figure 11:
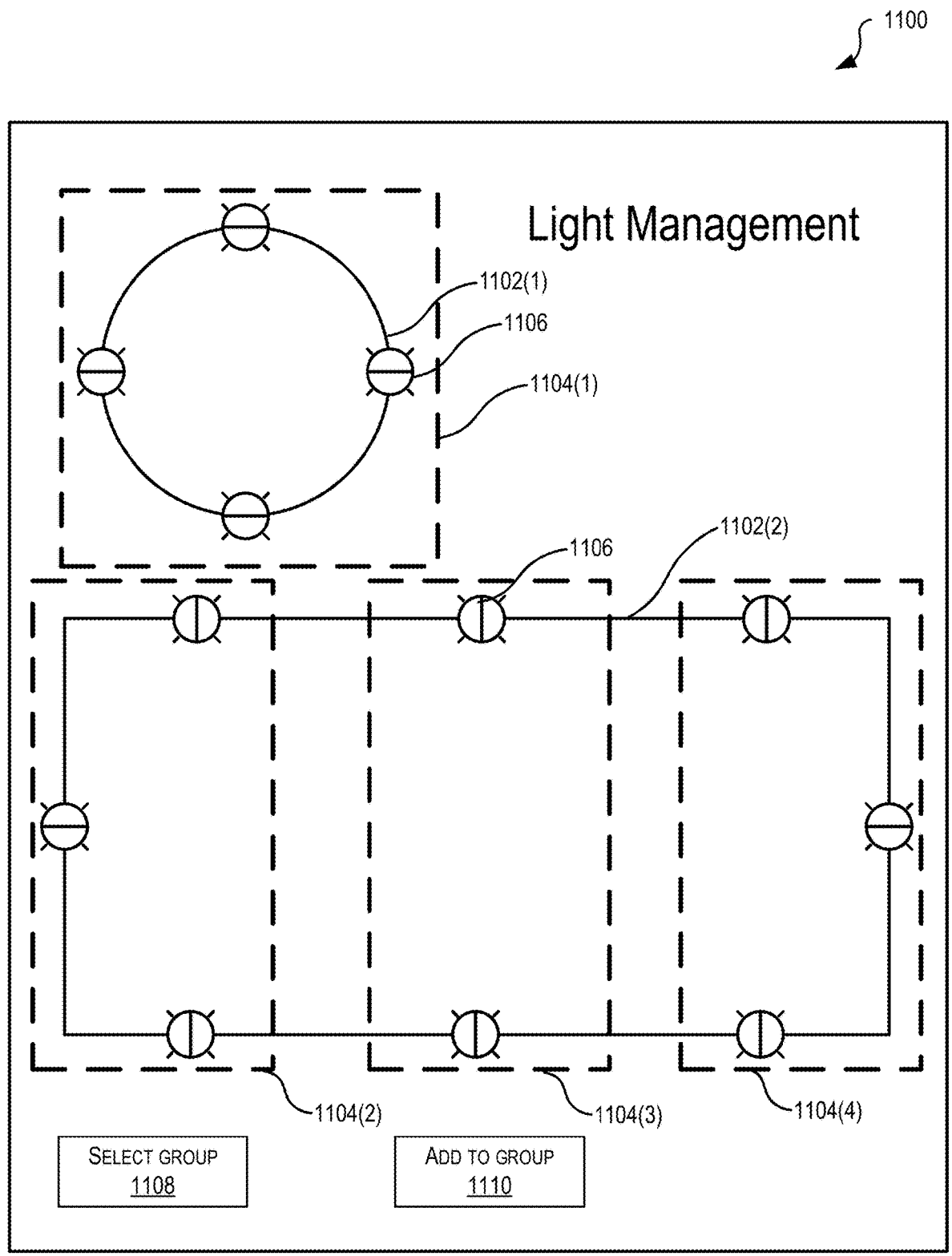
FIG. 11 illustrates an example user interface for interacting with a lighting system, according to at least one example.

FIG. 11 illustrates an example user interface 1100 for interacting with a lighting system, according to at least one example. The user interface 1100 may be presented on a display of any suitable electronic device, e.g., handheld user device, mobile phone, laptop, desktop, tablet, etc. In particular, the user interface 1100 may be presented using a computer application such as a mobile application, desktop application, web application, or the like.

The user interface 1100 generally depicts light system locations 1102(1) and 1102(2). In this example, the light system location 1102(1) is a spa and the light system location 1102(2) is a pool. While two locations are illustrated, the user interface 1100 may depict any suitable number. The light system locations 1102 are representations of a physical space (e.g., a pool deck). Each light system location 1102 is typically its own light group and/or may be divided into one or more groups 1104. In some examples, a group 1104 may include more than one location 1102. As illustrated, the location 1102(2) defines the group 1104(1) and the location 1102(2) includes groups 1104(2)-1104(4). Each group 1104 includes one or more user interface elements 1106 that represent lighting devices. The user interface 1100 also includes a select group button 1108 and an add to group button 1110. The select group button 1108, when selected, may allow a user to select individual user interface elements 1106 in order to queue them for adding to different light groups (e.g., redraw the boxes that define the groups 1104 to include different lighting devices). The add to group button 1110 may be used to execute the queue of selected lighting devices.

Figure 12:
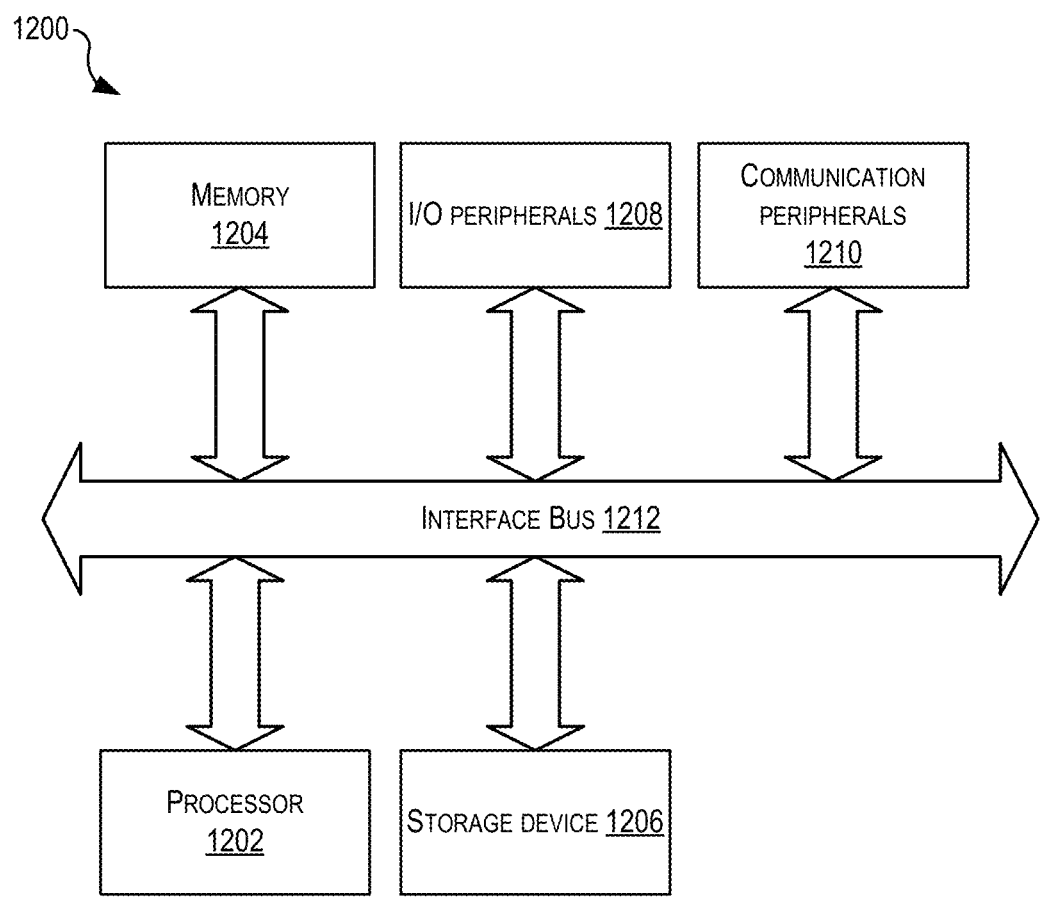
FIG. 12 illustrates an example system for implementing techniques relating to controlling lighting devices, according to at least one example.

FIG. 12 illustrates examples of components of a computer system 1200, according to at least one example. The computer system 1200 may be a single computer such as a user computing device and/or can represent a distributed computing system such as one or more server computing devices. The computer system 1200 is an example of the external computing devices, the MCUs, and other controllers described herein.

The computer system 1200 may include at least a processor 1202, a memory 1204, a storage device 1206, input/output peripherals (I/O) 1208, communication peripherals 1210, and an interface bus 1212. The interface bus 1212 is configured to communicate, transmit, and transfer data, controls, and commands among the various components of the computer system 1200. The memory 1204 and the storage device 1206 include computer-readable storage media, such as Radom Access Memory (RAM), Read ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1204 and the storage device 1206 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1200.

Further, the memory 1204 includes an operating system, programs, and applications. The processor 1202 is configured to execute the stored instructions and includes, for example, a logical processing unit, a microprocessor, a digital signal processor, and other processors. The memory 1204 and/or the processor 1202 can be virtualized and can be hosted within another computing system of, for example, a cloud network or a data center. The I/O peripherals 1208 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1208 are connected to the processor 1202 through any of the ports coupled to the interface bus 1212. The communication peripherals 1210 are configured to facilitate communication between the computer system 1200 and other computing devices over a communications network and include, for example, a network interface controller, modem, wireless and wired interface cards, antenna, and other communication peripherals.

In the following, further examples are described to facilitate the understanding of the present disclosure.

Example 1. In this example, there is provided a lighting system for a swimming pool or spa, including:
  an integrated control device, including:
    an enclosure;
    a transformer within the enclosure, the transformer having a high voltage input configurable to receive first power from an external source, and a low voltage output configurable to transport second power from the transformer;
    a controller within the enclosure and configured to receive the second power from the transformer; and
  a lighting device electrically connectable to receive the second power from the transformer via an electrical connection with the low voltage output, wherein the controller is configured to:
    receive control instructions from an external computing device; and
    send, via the electrical connection, control information based on the control instructions to the lighting device using the electrical connection when the lighting device is connected to the low voltage output via the electrical connection.

Example 2. In this example, there is provided the lighting system of any of the preceding or subsequent examples, wherein the integrated control device further includes a network interface configured to establish a network connection with an external computing device, and wherein receiving the control instructions includes receiving the control instructions via the network interface.

Example 3. In this example, there is provided the lighting system of any of the preceding or subsequent examples, wherein the enclosure includes an interior volume and a mounting bracket within the interior volume, with the transformer and the controller mounted to the mounting bracket.

Example 4. In this example, there is provided the lighting system of any of the preceding or subsequent examples, wherein the external computing device includes at least one of a mobile electronic device or an automation system.

Example 5. In this example, there is provided the lighting system of any of the preceding or subsequent examples, wherein the controller is further configured to generate the control information based on the control instructions.

Example 6. In this example, there is provided the lighting system of any of the preceding or subsequent examples, wherein sending the control information includes sending the control information using a power line communication (PLC) scheme.

Example 7. In this example, there is provided a method, including:
- receiving, at a controller, control instructions from an external computing device;
- determining, by the controller, a setting for a lighting device based on the control instructions;
- generating, by the controller, control information for the lighting device to implement the setting; and
- sending, by the controller, the control information to the lighting device via a low voltage power line that powers the lighting device, wherein the low voltage power line is electrically connected to a transformer.

Example 8. In this example, there is provided the method of any of the preceding or subsequent examples, wherein the control information includes light transition information useable by the lighting device to transition between at least two colors.

Example 9. In this example, there is provided the method of any of the preceding or subsequent examples, wherein the light transition information includes: a set of beginning color values, a set of final color values, and a timing value defining a time to transition from the set of beginning color values to the set of final color values.

Example 10. In this example, there is provided the method of any of the preceding or subsequent examples, wherein the controller and the transformer are housed within an enclosure.

Example 11. In this example, there is provided the method of any of the preceding or subsequent examples, wherein sending, by the controller, the control information to the lighting device via the low voltage power line includes sending the control information without a bridge.

Example 12. In this example, there is provided a method, including:
- reading, by a controller, a plurality of addresses associated with a plurality of lighting devices electrically connected to the controller;
- sending a set of addresses of the plurality of addresses to an external computing device;
- responsive to receiving a first instruction from the external computing device that identifies a first address of the set of addresses, causing a first lighting device of the plurality of lighting devices to emit a first light; and
- responsive to receiving a second instruction from the external computing device, assigning the first lighting device to a first light group.

Example 13. In this example, there is provided a method, including:
- providing a user interface including a plurality of user interface elements that represent a plurality of lighting devices;
- responsive to a first user selection of a first user interface element of the plurality of user interface elements, causing a first lighting device of the plurality of lighting devices to emit a light;
- responsive to a second user selection, assigning the first lighting device to a light group; and
- causing a change to the light after assigning the first lighting device to the light group.

Example 14. In this example, there is provided the method of any of the preceding or subsequent examples, wherein causing the first lighting device to emit the light includes causing the first lighting device to emit a flashing light.

Example 15. In this example, there is provided the method of any of the preceding or subsequent examples, wherein causing the change to the light includes causing the first lighting device to emit a colored light that is associated with the light group.

Example 16. In this example, there is provided there is a light emitting device, including:
- a set of light-emitting diodes (LEDs);
- a controller in electrical communication with the set of LEDs and configured to:
  - receive, via a power line communication (PLC) scheme on a low voltage power line, light transition information;
  - identify, from the light transition information, a set of beginning color values, a set of final color values, and a timing value defining a transition time period to transition from the set of beginning color values to the set of final color values;
  - determine a set of intermediate color values to transition from the set of beginning color values to the set of final color values during the transition time period; and
  - cause the set of LEDs to implement the set of intermediate color values during the transition time period.

Example 17. In this example, there is provided the light emitting device of any of the preceding or subsequent examples, wherein the light transition information is included in a single message.

Example 18. In this example, there is provided the light emitting device of any of the preceding or subsequent examples, wherein the set of beginning color values, the set of final color values, and the timing value are predefined values.

Example 19. In this example, there is provided the light emitting device of any of the preceding or subsequent examples, wherein at least one of the set of beginning color values, the set of final color values, or the timing value is user-selected.

Example 20. In this example, there is provided the light emitting device of any of the preceding or subsequent examples, wherein the controller is further configured to receive address information that uniquely identifies each LED of the set of LEDs, and wherein causing the set of LEDs to implement the set of intermediate color values during the transition time period includes using the address information to uniquely instruct individual LEDs of the set of LEDs to implement the set of intermediate color values during the transition time period.

Example 21. In this example, there is provided a method, including:
- detecting, by a pool automation system, occurrence of a predefined trigger indicative of a lighting device changing to a current color;
- requesting, from a controller that controls the lighting device, a current set of light values corresponding to the current color;
- storing, by the pool automation system, the current set of light values in a memory associated with the pool automation system; and
- providing the current set of light values to a plurality of user interfaces.

Example 22. In this example, there is provided the method of any of the preceding or subsequent examples, wherein the plurality of user interfaces comprise two or more of a first user interface of an application on a mobile device connected to the pool automation system, a second user interface of the application on the mobile device connected to the controller, or a third user interface connected to the pool automation system.

Example 23. In this example, there is provided the method of any of the preceding or subsequent examples, wherein detecting occurrence of the predefined trigger includes monitoring communications between the pool automation system and the controller for the predefined trigger.

Example 24. In this example, there is provided there is an integrated control device for a pool lighting system, including:
- an enclosure that defines an interior volume;
- a transformer housed within the interior volume, the transformer including a high voltage leg and a low voltage leg;
- a set of high voltage terminals electrically coupled to the high voltage leg;
- a set of low voltage terminals electrically coupled to the low voltage leg; and
- a controller housed within the interior volume, wherein:
  - the controller is configured to output control signals via the set of low voltage terminals; and
  - the transformer is configured to output power signals via the set of low voltage terminals.

Example 25. In this example, there is provided the integrated control device of any of the preceding or subsequent examples, wherein the controller further includes an interface for receiving control information from an external computing device.

Example 26. In this example, there is provided the integrated control device of any of the preceding or subsequent examples, wherein the interface includes at least one of a network interface or a serial communications interface.

Example 27. In this example, there is provided the integrated control device of any of the preceding or subsequent examples, wherein the control signals control a connected lighting device and the power signals power the connected lighting device.

Example 28. In this example, there is provided a lighting device, including:
- a set of light emitting diodes (LEDs);
- a set of LED drivers communicatively coupled with the set of LEDs;
- a microprocessor configured to:
  - receive power line communication (PLC) signals including control instructions; and
  - control the set of LED drivers by at least powering on and powering off the LED drivers; and
- a switching circuit configured to detect power on and power off the LED drivers independent of the microprocessor powering on and powering off the LED drivers.

Example 29. In this example, there is provided the lighting device of any of the preceding or subsequent examples, further including a rectifier configured to receive alternating current and provide direct current to the LED drivers.

Example 30. In this example, there is provided the integrated control device of any of the preceding or subsequent examples, further including a temperature sensor communicatively coupled with the microprocessor, wherein the microprocessor is further configured to:
- receive control instructions via a first PLC signal;
- generate and send control information to the set of LED drivers;
- receive sensor data from the temperature sensor; and
- send the sensor data via a second PLC signal to an external computing device Example 31. In this example, there is provided the integrated control device of any of the preceding or subsequent examples, wherein the control information includes a set of beginning color values for the set of LEDs, and a set of final color values for the set of LEDs, and a timing value defining a time to transition the set of LEDs from the set of beginning color values to the set of final color values.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although applicant has described devices and techniques for use principally with swimming pools and spas, persons skilled in the relevant field will recognize that the present invention may be employed in connection with other objects and in other manners. Finally, references to "pools" and "swimming pools" herein may also refer to spas or other water containing vessels used for recreation or therapy and for which cleaning is needed or desired.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A lighting system for a swimming pool or spa, comprising:
    an integrated control device, comprising:
        an enclosure;
        a transformer within the enclosure, the transformer having a high voltage input configurable to receive first power from an external source, and a low voltage output configurable to transport second power from the transformer; and
        a controller within the enclosure and configured to receive the second power from the transformer; and
    a lighting device electrically connectable to receive the second power from the transformer via an electrical connection with the low voltage output, wherein the controller is configured to:
    receive control instructions from an external computing system; and
    send, using a power line communication scheme and without passing through the transformer, control information based on the control instructions to the lighting device using the electrical connection when the lighting device is connected to the low voltage output via the electrical connection.

2. The lighting system of claim 1, wherein the integrated control device further comprises a network interface configured to establish a network connection with the external computing system, and wherein receiving the control instructions comprises receiving the control instructions via the network interface.

3. The lighting system of claim 1, wherein the enclosure comprises an interior volume and a mounting bracket within the interior volume, with the transformer and the controller mounted to the mounting bracket.

4. The lighting system of claim 1, wherein the external computing system comprises at least one of a mobile electronic device or an automation system.

5. The lighting system of claim 1, wherein the controller is further configured to generate the control information based on the control instructions.

6. A method, comprising:
    receiving, at a high voltage input of a transformer, first power from an external source;
    transporting, at a low voltage output of the transformer, second power from the transformer;
    receiving, at a controller, control instructions from an external computing system;
    determining, by the controller, a setting for a lighting device based on the control instructions;
    generating, by the controller, control information for the lighting device to implement the setting; and
    sending, by the controller, the control information to the lighting device via a low voltage power line that powers the lighting device, using a power line communication scheme, and without passing through the transformer, wherein the low voltage power line is electrically connected to the low voltage output of the transformer.

7. The method of claim 6, wherein the control information comprises light transition information useable by the lighting device to transition between at least two colors.

8. The method of claim 7, wherein the light transition information comprises: a set of beginning color values, a set of final color values, and a timing value defining a time to transition from the set of beginning color values to the set of final color values.

9. The method of claim 6, wherein sending, by the controller, the control information to the lighting device via the low voltage power line comprises sending the control information without a bridge.

10. An integrated control device for a pool lighting system, comprising:
  an enclosure that defines an interior volume;
  a transformer housed within the interior volume, the transformer comprising a high voltage leg and a low voltage leg;
  a set of high voltage terminals electrically coupled to the high voltage leg;
  a set of low voltage terminals electrically coupled to the low voltage leg; and
  a controller housed within the interior volume, wherein:
    the controller is configured to output control signals using a power line communication scheme via the set of low voltage terminals and without passing through the transformer; and
    the transformer is configured to output power signals via the set of low voltage terminals.

11. The integrated control device of claim 10, wherein the controller further comprises an interface for receiving control information from an external computing system.

12. The integrated control device of claim 11, wherein the interface comprises at least one of a network interface or a serial communications interface.

13. The integrated control device of claim 10, wherein the control signals control a connected lighting device and the power signals power the connected lighting device.

14. A system, comprising:
  memory configured to store computer-executable instructions; and
  one or more processors configured to access the memory and execute the computer-executable instructions to cause a controller to at least:
    receive control instructions from an external computing system;
    determine a setting for a lighting device based on the control instructions;
    generate control information for the lighting device to implement the setting; and
    send, using a power line communication scheme and without passing through a transformer, the control information to the lighting device via a low voltage power line that powers the lighting device, wherein the low voltage power line is electrically connected to the transformer, wherein the controller and the transformer are housed within an enclosure.

15. The system of claim 14, wherein the control information comprises light transition information useable by the lighting device to transition between at least two colors.

16. The system of claim 15, wherein the light transition information comprises: a set of beginning color values, a set of final color values, and a timing value defining a time to transition from the set of beginning color values to the set of final color values.

17. The system of claim 14, wherein sending the control information to the lighting device via the low voltage power line comprises sending the control information without a bridge.

18. A non-transitory computer readable medium comprising instructions that when executed by one or more processors of a controller cause the controller to perform operations comprising:
  receiving control instructions from an external computing system, wherein the controller is electrically connected to a low voltage output of a transformer;
  determining a setting for a lighting device based on the control instructions;
  generating control information for the lighting device to implement the setting; and
  sending the control information to the lighting device via a low voltage power line that powers the lighting device, using a power line communication scheme, and without passing through the transformer, wherein the low voltage power line is electrically connected to the lower voltage output of the transformer.

19. The non-transitory computer readable medium of claim 18, wherein the control information comprises light transition information useable by the lighting device to transition between at least two colors.

20. The non-transitory computer readable medium of claim 19, wherein the light transition information comprises: a set of beginning color values, a set of final color values, and a timing value defining a time to transition from the set of beginning color values to the set of final color values.

21. The non-transitory computer readable medium of claim 18, wherein the controller and the transformer are housed within an enclosure.

22. The non-transitory computer readable medium of claim 18, wherein sending the control information to the lighting device via the low voltage power line comprises sending the control information without a bridge.

23. The lighting system of claim 1, wherein the enclosure comprises a housing that defines an interior volume, and wherein the transformer and the controller are mounted to the housing within the interior volume.

24. The lighting system of claim 1, wherein the low voltage output of the transformer is configured to power each of the controller and the lighting device with the second power, and wherein the second power comprises a low voltage.

* * * * *